Nov. 27, 1934.  W. SWIFT  1,982,487

FRENCHING MACHINE

Filed Sept. 8, 1932    2 Sheets-Sheet 1

Inventor
WILLIAM SWIFT

By Semmes & Semmes
Attorneys

Nov. 27, 1934.  W. SWIFT  1,982,487
FRENCHING MACHINE
Filed Sept. 8, 1932   2 Sheets-Sheet 2

Inventor
WILLIAM SWIFT
By Semmes & Semmes
Attorneys

Patented Nov. 27, 1934

1,982,487

UNITED STATES PATENT OFFICE 1,982,487

FRENCHING MACHINE

William Swift, Omaha, Nebr.

Application September 8, 1932, Serial No. 632,228

2 Claims. (Cl. 17—26)

This invention relates to meat treating machines of the type commonly called Frenching machines and adapted to mechanically treat flat cuts of meat to render them tender.

The purpose of such devices, frequently used to treat the more inexpensive cuts of meat, is to cut, tear or crush the tough fibers therein, whereby the desirability of such cuts is materially improved. Various undesirable features, however, are found in many of the machines now used for this purpose. One common fault is the tendency to macerate the surface of the meat in subjecting it to this treatment, rendering it more or less unattractive in appearance. Again, particles of meat are easily detached from such a macerated surface and tend to lodge in the machine where they soon spoil, contaminating the meat that is later treated. Frequently oil, flowing from the bearings of the machine or dropped upon it during oiling operations, comes in contact with the meat, making it unclean and giving it an unattractive taste. Such contaminating influences are increased by the difficulty of cleaning the more complicated types of these machines. Many of these machines, moreover, in crushing the fibers, express from the meat its natural juices, leaving it dry and pulpy.

These and other undesirable features in existing machines have caused such treatment to receive relatively little favor from the public, as the results thereof were associated with the process itself. Such undesirable features, however, are not inherent in the process, and have existed heretofore merely because the designers of the machines had not satisfactorily solved the problem before them. There can be no doubt that the public, particularly in such times as the present, will be quick to recognize the merit of the process when a machine capable of carrying it out without the undesirable effects noted above is brought before them.

It is accordingly a major purpose of my invention to provide a method and apparatus for making meat tender, which is free from the objectionable features recited above.

More specifically, it is an object of my invention to provide a sanitary, easily cleaned, Frenching machine wherein the possibility of particles of meat lodging therein is reduced to practically a nullity.

It is a further object of my invention to provide a method and apparatus for rendering meat tender, that will destroy the tough fibers therein without macerating the surface thereof, and without expressing the natural juices therefrom.

It is a still further object of my invention to provide such a machine wherein various improvements mutually cooperate to produce a more satisfactory operation of the device as a whole.

With these and other objects in view, which may be incident to my improvement, the invention consists in the parts, combinations, and methods hereinafter set forth, with the understanding that variations therein may be carried out without departing from the spirit of the invention or the scope of the appended claims.

An embodiment of the invention is illustrated in the accompanying drawings, in which.

Figure 1:
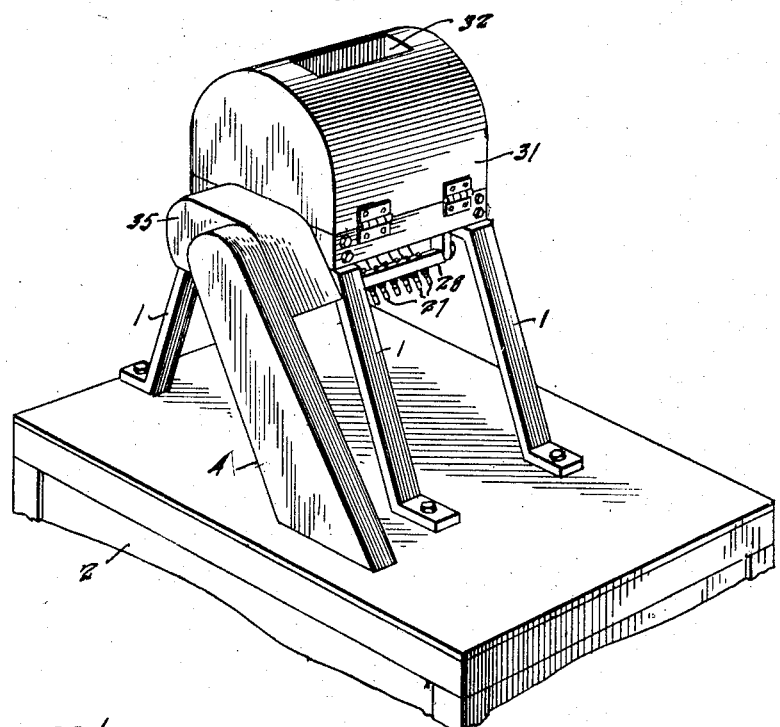
Fig. 1 is a perspective view of a form of my Frenching machine.

As shown in Fig. 1, the Frenching machine is mounted upon standards 1, 1, which support it upon any suitable surface. In the illustrated form the machine is mounted upon a housing 2 which encloses the driving parts. Such parts drive the device through the chain 3, also provided with a housing, designated 4.

Extending across the standards 1, 1 are the braces 5, 6, which are secured thereto by bolts 7. Tie bars 8, 8 are secured to the braces by bolts 9, and extend above and parallel to the standards. The parts just described form a strong, rigid, rectangular frame, which receives the operating parts of the machine.

Located between each standard 1 and the corresponding bar 8 is a steel spacer bearing block 10 secured by bolts 11 to brace 5 and provided with positioning flanges 12. Another pair of bearing blocks 13, 13 are slidably positioned between the standards and the braces, and are provided with flanges similar to the flanges 12. Each block 13 is provided with a threaded shaft 14 which is adapted to pass through an aperture in the brace 6. There is threaded on the shaft 14 on one side of the brace 6 a nut 15, and on the opposite side a nut 15' is provided. It will be appreciated that the operation of these nuts effects a movement of the bearing blocks 13 with respect to the opposite blocks 10. All of the bearing blocks 10, 10, 13, 13 are provided with bearings 16 made of a suitable wood which does not require oiling, thus eliminating any possible contamination of the meat by oil.

The bearings just described support the rolls 17 and 18. Roll 17 is rotatably held in a fixed position, as it passes through the fixed bearing blocks 10. Projecting beyond one of the blocks 10 is an extension 19 integral with the roll 17, to which is keyed a sprocket wheel 20, adapted to receive chain 3. Also keyed to the extension 19 is a gear 21, meshing with a corresponding gear 22 keyed to an extension 23 integral with roll 18. Roll 18, extending through the bearing blocks 13, is adjustable towards or away from roll 17, such relative movement being permitted by the sufficient height of the gear teeth on gears 21 and 22.

Figure 2:
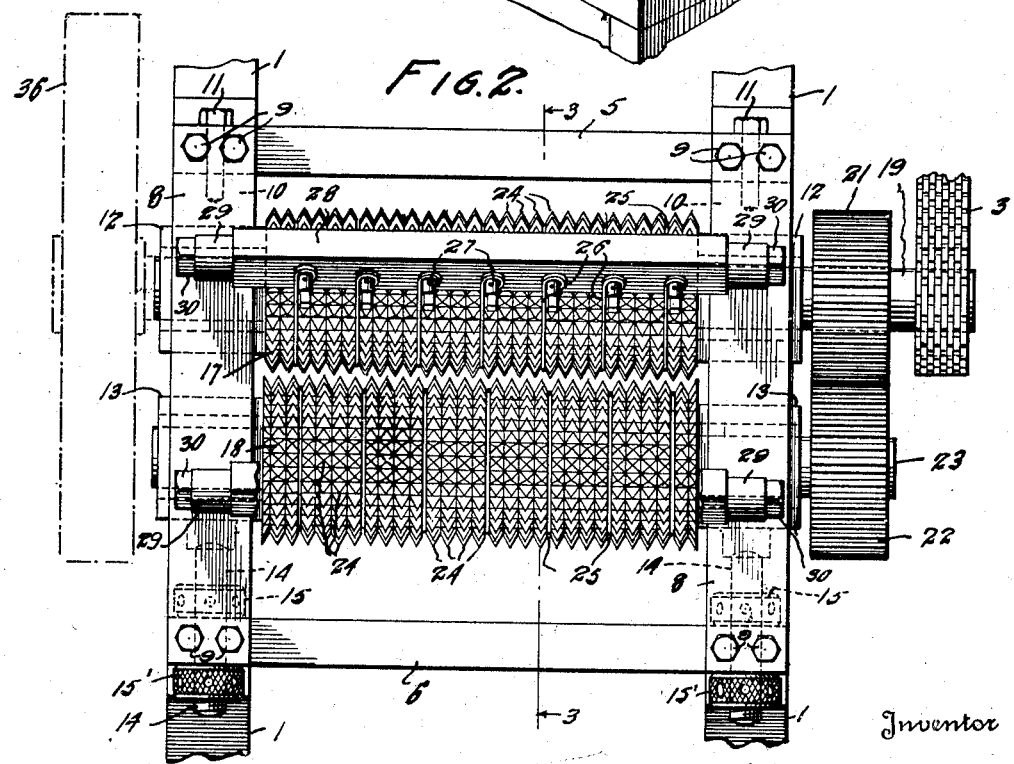
Fig. 2 is a plan view thereof, with the hopper cover removed.
Figure 3:
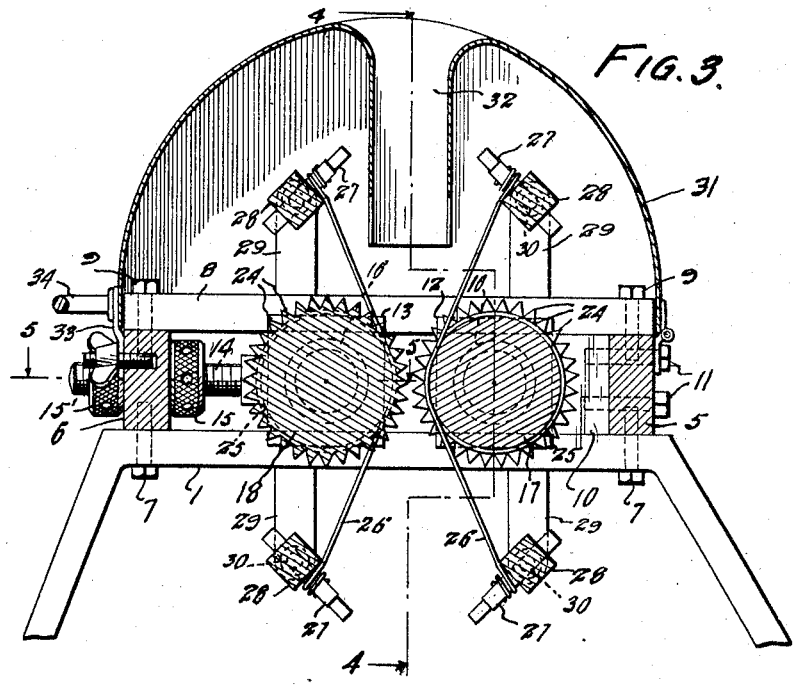
Fig. 3 is a sectional view thereof, taken upon the line 3—3 of Fig. 2.
Figure 4:
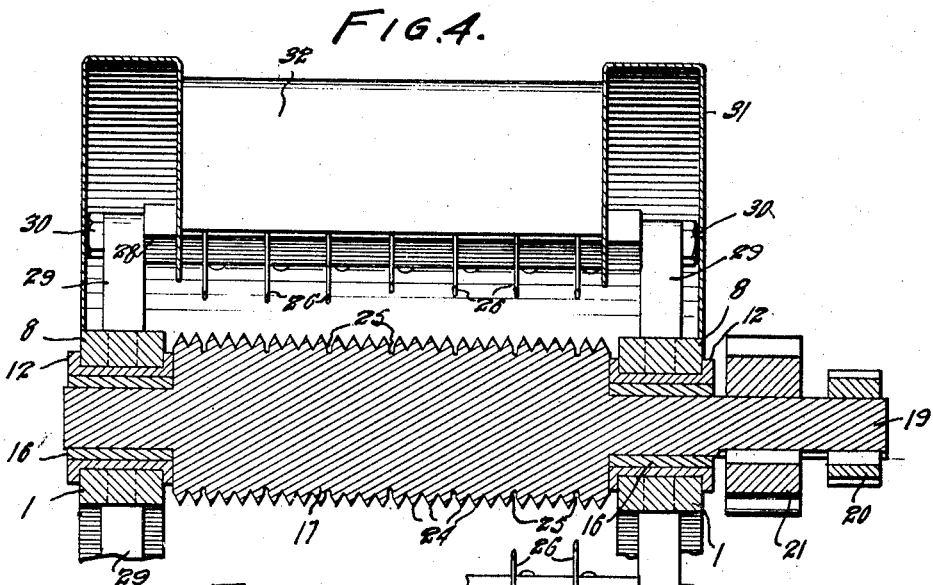
Fig. 4 is another sectional view thereof, taken upon line 4—4 of Fig. 3.
Figure 5:
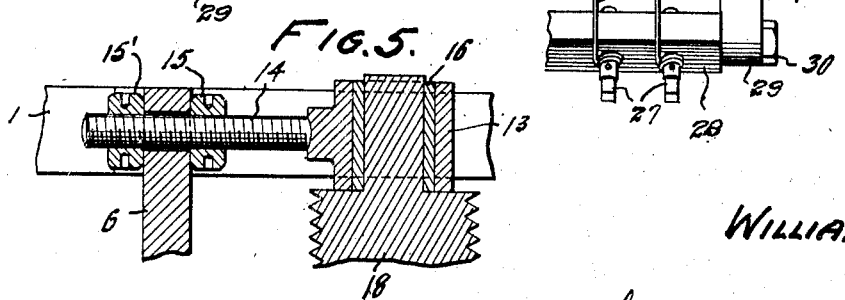
Fig. 5 is a detail sectional view of a portion of the machine, taken upon line 5—5 of Fig. 3.

The configuration of the surfaces of the rolls will be best understood from the drawings. Each such surface consists of a number of rectangular pyramids 24, contiguously placed to each other in contiguous longitudinal and circumferential rows. This arrangement has numerous advantages. Each separate surface of the pyramids is flat and easily cleaned. Moreover, the adjacent surfaces are aligned in longitudinal and circumferential V-shaped grooves, which permits cleaning a number of such surfaces in one operation. In treating the meat, the apexes of the pyramids constitute points that dig into the meat to feed it uniformly through the rollers. On each pyramid the apex is surrounded by four flat surfaces, all of which are used in crushing the meat. This result is obtained by staggering the rows of pyramids on the rolls circumferentially, as shown in Fig. 3, so that they are in effect "in mesh", and also staggering them longitudinally of the rolls, as shown in Fig. 2. By this arrangement, each face of each pyramid has a cooperating surface on the other roll as the rolls are turned. Morever, the pressure extended between any two of such cooperating surfaces varies as the rolls are turned, so that when one portion is under high pressure an adjacent portion is under a lower pressure. This arrangement provides a place for the expressed juice to go, without being forced out of the meat. The pressure crushes the tough fibers or, by reason of its differential effect, tears the fibers, while the flat faces of the teeth insure that the surface of the meat is left intact and not mutilated.

Because of the features just described, the meat is not macerated and there is no tendency for any particles thereof to become separated therefrom. Moreover, as the crushing surfaces are flat planes, there are no undercut recesses in which such particles, even if they were present, could lodge. However, when the meat is warm, there is some tendency for the meat to stick, as a whole, to the metal of the rolls. Partly because of this reason, I have found it advantageous to have the meat at about 32° F. when it is treated. To be certain that the meat leaves the rolls, however, I have provided grooves 25, extending circumferentially around the rolls at spaced distances along the rolls. In these grooves the wires 26 are arranged as shown in Fig. 3, lying in the bottom of the grooves for about 30° on each side of line of points closest to the opposite roll. Extending upwardly and outwardly, the wires form in effect a hopper that aids in feeding the meat to the rolls; and the other ends of the wires, extending downwardly and leaving the rolls, insure that the flat cut of meat is lifted from one roll or the other, if it has not already left them. The ends of the wires are arranged on individual adjusting pins 27, arranged in rows on bars 28, the ends of which are turned down to extend rotatively through standards 29. By turning a bar 28 in its bearings, the whole row of pins thereon are moved to tighten or loosen the wires attached thereto. Nuts 30 are provided to hold the bars in their desired position.

Hinged to brace 5 is a cover 31 having, in general, a semi-cylindrical shape. Vertically above the space between rolls 17 and 18 the cover is provided with a hopper 32, adapted to receive cuts of meat fed thereto by hand or from a conveyor, and effectively supplemented, as explained above, by the upper portions of wires 26, to feed the meat between the rolls. On the side of the cover opposite the hinges, a latch 33 and a lifting handle 34 are provided. To complete the protective casing, a cover 35 is provided to enclose the gears 21, 22 and the sprocket wheel 20.

In order to insure smooth operation of the rolls, and to prevent sudden loads upon the driving motor, it is advisable to use a fly wheel, shown in Fig. 2 as 36, which may be attached to an extension on roll 17.

From the above description, it is apparent that I have provided a Frenching machine having many advantages. Since it eliminates the use of lubricating oil, since it does not cause particles of meat to become detached from the cut of meat, and since it provides no recesses for such particles, even if present, to lodge, the machine has decided sanitary merit. Moreover, the device, by reason of its sanitary cover and the arrangement of the pyramidal surfaces in V-shaped grooves, is easily cleaned without dismounting any parts. As previously explained, the machine insures a very satisfactory treatment of the surface while effectively destroying the tough fibers, and it does not express from the meat any of its natural juices. A hopper, supplemented by guiding wires, insures satisfactory feeding of the meat to the machine, while other portions of the wires insure the removal of the cut as a whole, leaving the rolls clean and free from meat. Such wires are adjustable individually or in sets, and the rolls are adjustable to vary the effect of the treatment or accommodate cuts of various thicknesses. Safety housings are provided over all moving parts, and effectively keep the working parts of the device free from dust or dirt. A positive gear drive insures the correct relative positioning of the pyramids on the rolls and a positive drive of both rolls which is effective in treating the tougher cuts of meat. These and the other advantages apparent from the structure provide a satisfactory Frenching machine for large scale, commercial operations, although, of course, the same principles are applicable to a smaller device for domestic use.

While I have shown and described the preferred embodiments of my invention it is to be understood that these are given merely as exemplifying the underlying principles of the invention and are not to be considered as restricting the invention to the particular elements shown, except as such restrictions are clearly shown in the appended claims.

I claim:

1. In a device of the character described, a plurality of meat treating rolls, the surfaces of which are composed of contiguous rectangular pyramids, a set of wires strung across each roll transversely thereof, said sets of wires spreading apart as they extend upwardly from the rolls to form a hopper for feeding the meat to the rolls, and extending downwardly from the rolls to insure removal of the treated meat therefrom, a support for the lower ends of said wires comprising a rotatable bar, a plurality of pegs spaced along the length of the bar and rotatable therein, and means for securing each of the wires to an independent peg.

2. In a device of the character described, a support, a pair of meat treating rolls having surfaces composed of contiguous pyramids, said rolls being rotatably mounted in journal blocks, the journal blocks for one of the rolls being permanently mounted on the support while the journal blocks for the other roll are slidably mounted on the support to permit the rolls to be spaced from each other, screws mounted on each slidable block and adapted to extend through a fixed bracket, nuts threaded on the screws on each side of the bracket to maintain the slidable rolls in fixed position, a set of wires strung across each roll transversely thereof and lying at the base of adjoining pyramids, said sets of wires spreading apart as they extend upwardly from the rolls to form a hopper for feeding the meat to the rolls, and extending downwardly from the rolls to insure removal of the treated meat therefrom, a pair of brackets extending upwardly and downwardly from each roll, a bar rotatably mounted in each pair of brackets and provided with means to prevent rotation, each bar being provided with a row of rotatable pins adapted to receive the ends of the wires, said bars permitting adjustment of the wires as a unit, and the pins permitting adjustment of the wires individually, and a cover for the machine provided with a hopper having depending walls which extend below the top of the sets of wires.

WILLIAM SWIFT.